(12) United States Patent
Pierson et al.

(10) Patent No.: US 11,278,107 B2
(45) Date of Patent: *Mar. 22, 2022

(54) METHODS AND APPARATUS FOR A GRIPPING DEVICE FOR A PORTABLE COMPUTING DEVICE

(71) Applicant: Grip Curl, LLC, Chandler, AZ (US)

(72) Inventors: Derrick Pierson, Chandler, AZ (US); Charles Pierson, Chandler, AZ (US); Aaron Bickel, Chandler, AZ (US)

(73) Assignee: Grip Curl, LLC, Chandler, AZ (US)

( * ) Notice: Subject to any disclaimer, the term of this patent is extended or adjusted under 35 U.S.C. 154(b) by 146 days.

This patent is subject to a terminal disclaimer.

(21) Appl. No.: 16/715,278

(22) Filed: Dec. 16, 2019

(65) Prior Publication Data

US 2020/0323332 A1    Oct. 15, 2020

Related U.S. Application Data

(63) Continuation-in-part of application No. 16/382,595, filed on Apr. 12, 2019, now Pat. No. 10,568,410.

(60) Provisional application No. 62/688,247, filed on Jun. 21, 2018.

(51) Int. Cl.
| | |
|---|---|
| *A45F 5/10* | (2006.01) |
| *H04M 1/04* | (2006.01) |
| *G06F 1/16* | (2006.01) |
| *H04B 1/3888* | (2015.01) |
| *A45C 11/00* | (2006.01) |

(52) U.S. Cl.
CPC .............. *A45F 5/10* (2013.01); *A45C 11/00* (2013.01); *G06F 1/1628* (2013.01); *H04B 1/3888* (2013.01); *H04M 1/04* (2013.01); *A45C 2011/002* (2013.01); *A45C 2011/003* (2013.01); *A45F 2200/0516* (2013.01); *A45F 2200/0525* (2013.01)

(58) Field of Classification Search
CPC .............. A45F 5/10; A45F 2200/0516; A45F 2200/0525; A45C 2011/002; A45C 2011/003; G06F 1/1613; G06F 1/1628; H04M 1/0279; H04M 1/04; H04B 1/3888; H04B 2001/3861
See application file for complete search history.

(56) References Cited

U.S. PATENT DOCUMENTS

| | | | |
|---|---|---|---|
| 4,020,527 | A | 5/1977 | O'Neill |
| 4,606,484 | A | 8/1986 | Winter et al. |
| 5,609,375 | A | 3/1997 | Cohen |

(Continued)

*Primary Examiner* — Dean J Kramer
(74) *Attorney, Agent, or Firm* — Noblitt & Newson, PLLC

(57) ABSTRACT

An apparatus for a gripping device for a portable computing device according to various aspects of the present technology may include a selectively deployable gripping element. A center section of the gripping element may be connected to the portable computing device by a gripping element retainer. The gripping element comprises opposing ends that extend away from the center section in a first position and curl inwards towards the center section and the gripping element retainer in a second position to form a ring. The opposing ends may comprise a locking mechanism configured to retain the opposing ends in the second position. The gripping element and the gripping element retainer may also be integrated with a cover or case configured to fit around the portable computing device.

18 Claims, 12 Drawing Sheets

(56) References Cited

U.S. PATENT DOCUMENTS

| | | | |
|---|---|---|---|
| 8,328,055 B1 | 12/2012 | Snyder | |
| 8,374,657 B2 | 2/2013 | Interdonato | |
| 8,690,210 B1 | 4/2014 | May | |
| 9,010,595 B2 * | 4/2015 | Yu | A45F 5/00 224/218 |
| 9,560,186 B2 | 1/2017 | Son et al. | |
| 9,874,260 B2 * | 1/2018 | Blochlinger | F16F 1/027 |
| 10,568,410 B2 * | 2/2020 | Pierson | H04M 1/04 |
| D900,121 S * | 10/2020 | Pierson | F16M 11/105 D14/447 |
| 2012/0074291 A1 | 3/2012 | Fu | |
| 2013/0295549 A1 | 11/2013 | Hills | |
| 2014/0262847 A1 * | 9/2014 | Yang | F16M 11/14 206/37 |
| 2014/0360893 A1 * | 12/2014 | Whitten | F16M 11/242 206/45.2 |
| 2015/0182009 A1 | 7/2015 | Whang et al. | |
| 2016/0345695 A1 | 12/2016 | Stagge | |
| 2019/0104623 A1 | 4/2019 | Backus | |

* cited by examiner

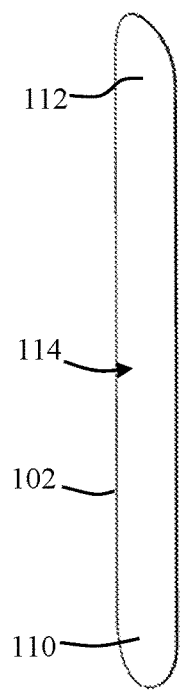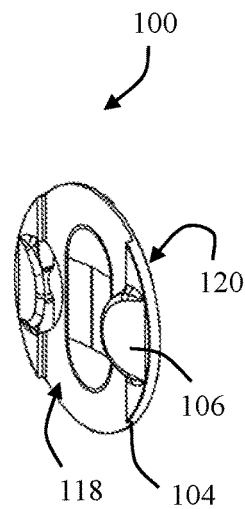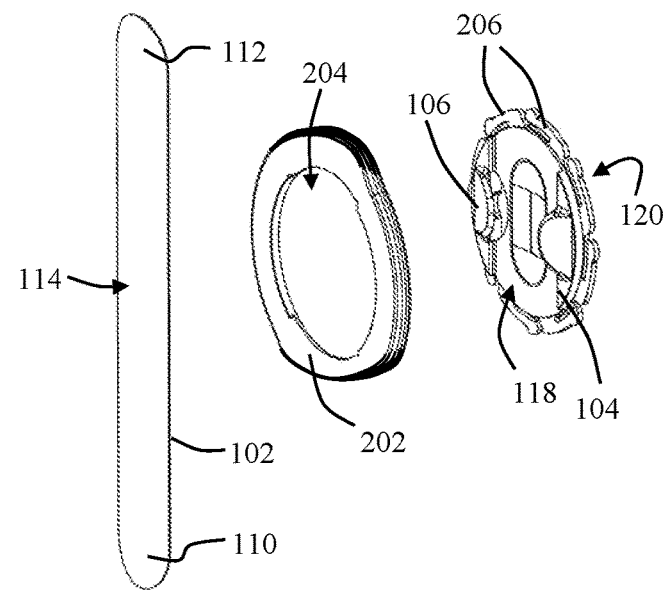
Figure 1
Figure 2
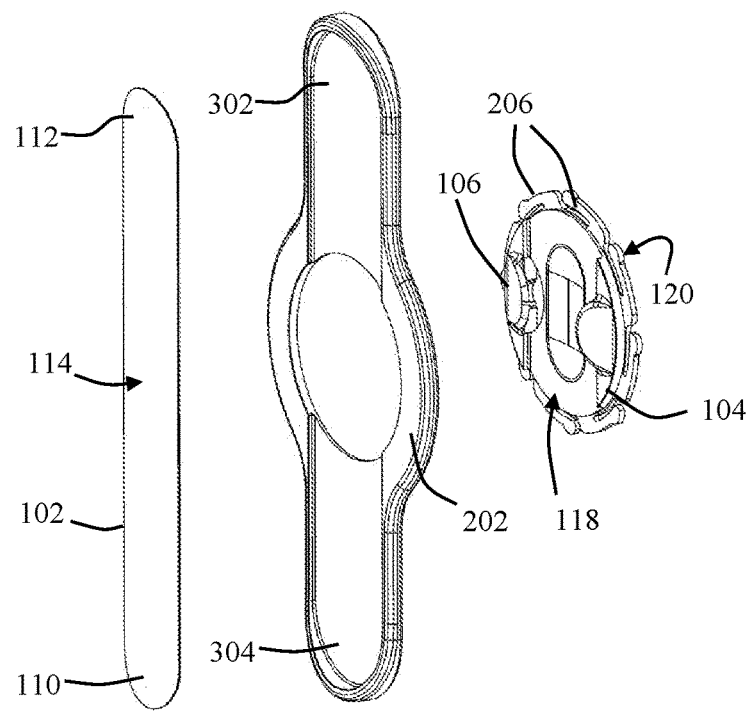
Figure 3

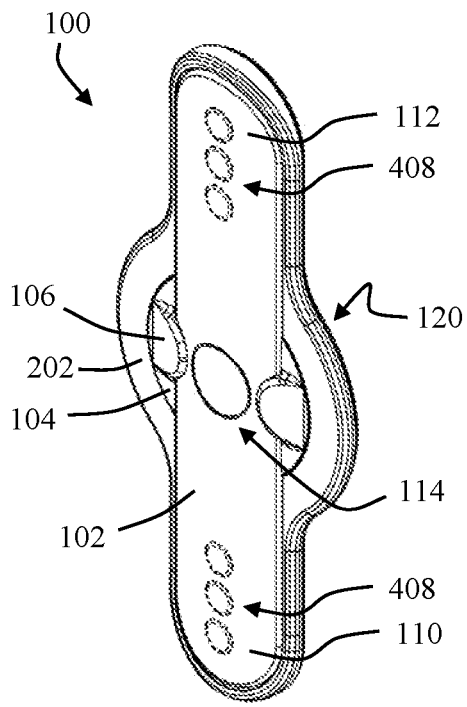
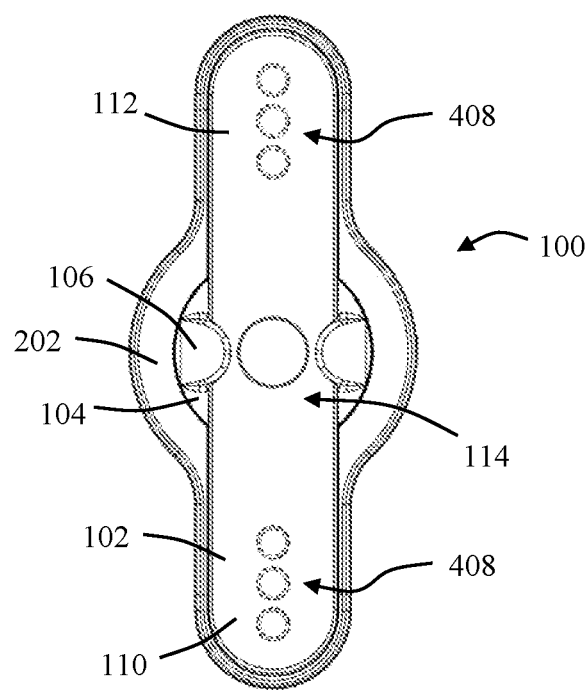
Figure 4
Figure 5
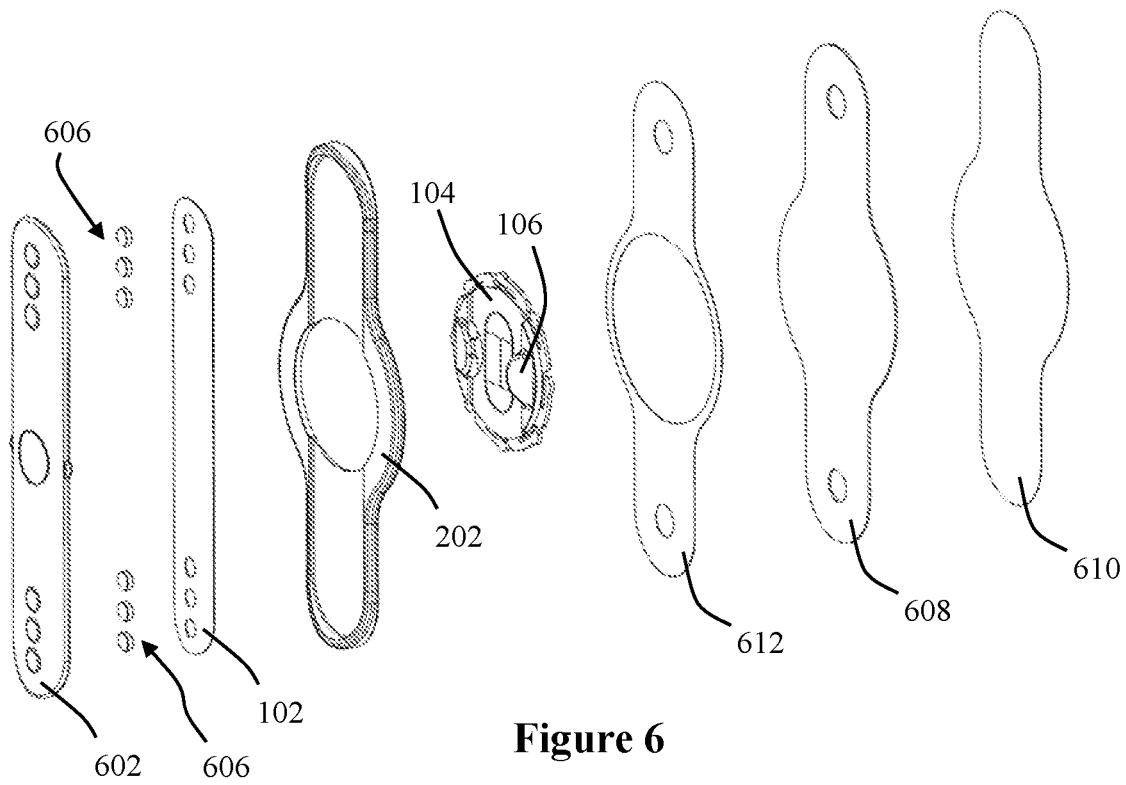
Figure 6

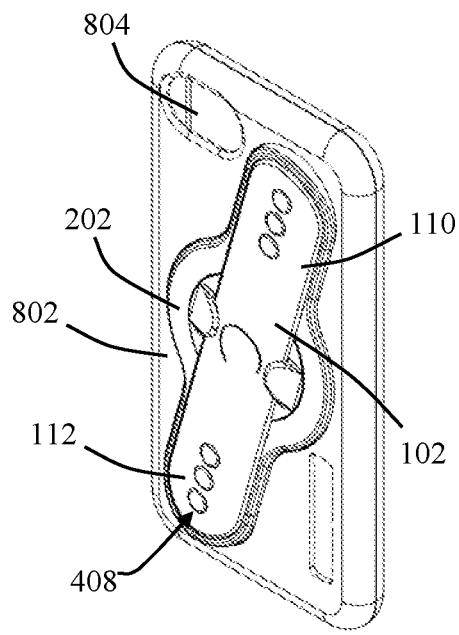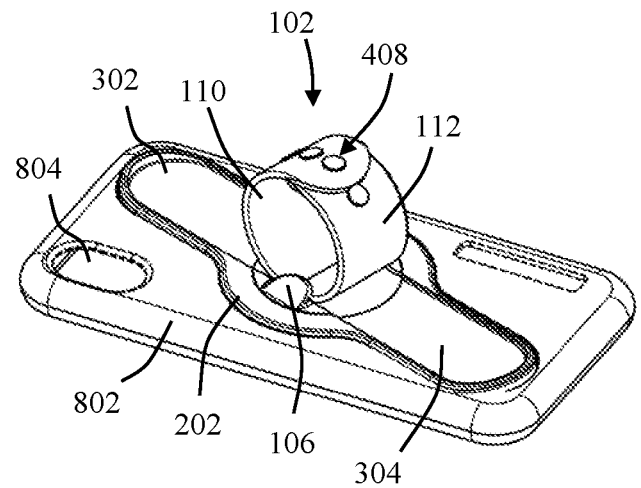
Figure 8A    Figure 8B
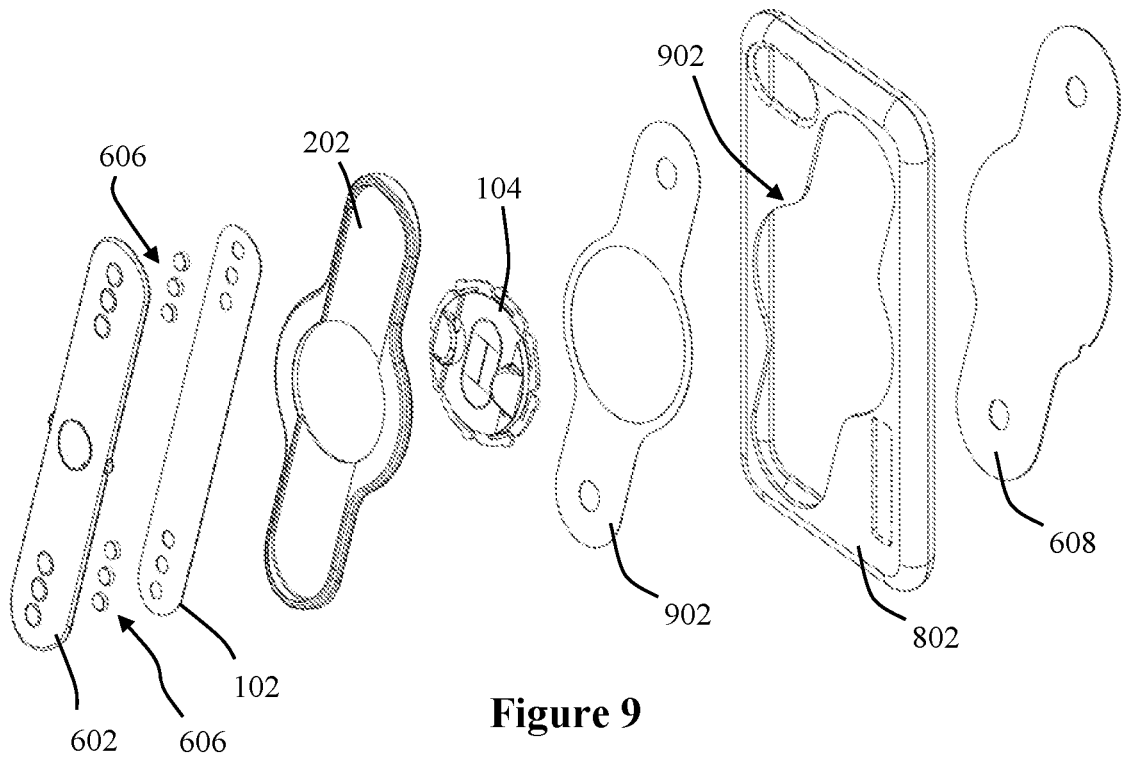
Figure 9

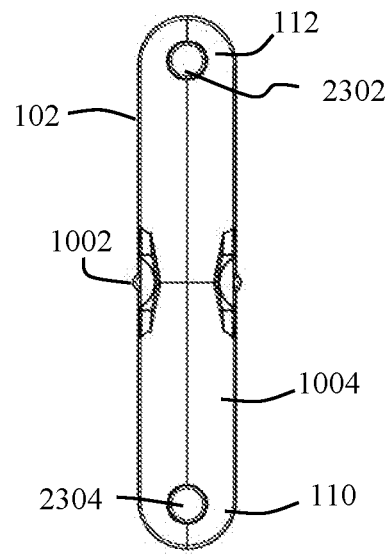
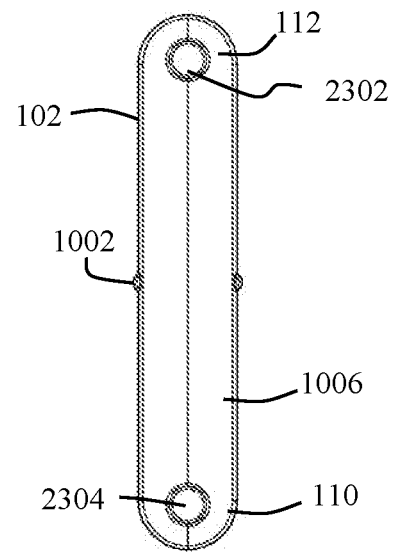
Figure 23   Figure 24
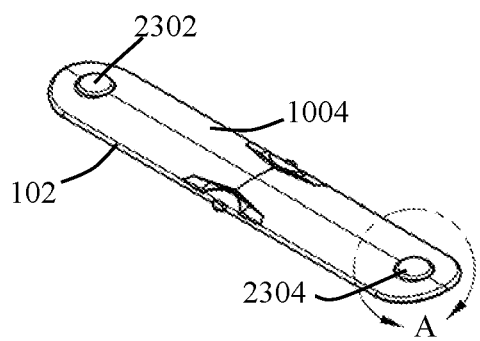
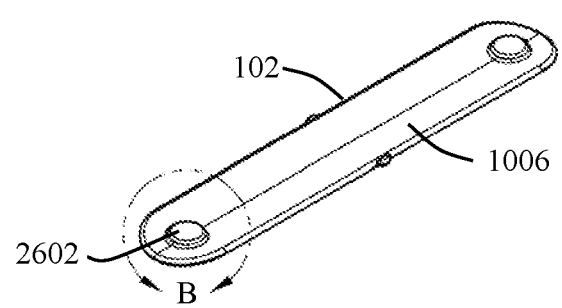
Figure 25   Figure 26
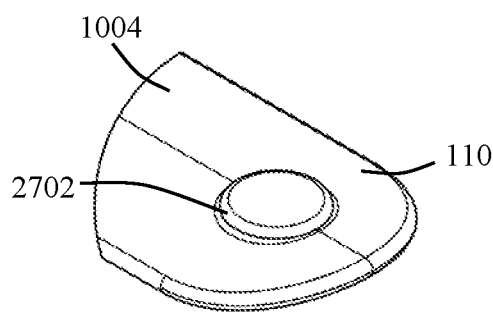
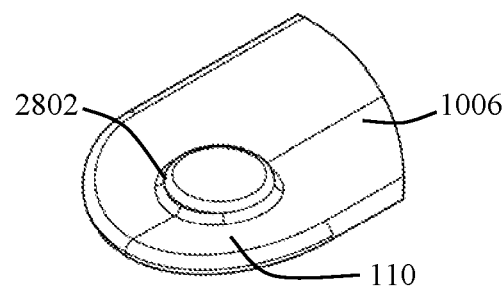
Figure 27   Figure 28

METHODS AND APPARATUS FOR A GRIPPING DEVICE FOR A PORTABLE COMPUTING DEVICE

CROSS-REFERENCES TO RELATED APPLICATIONS

This application is a continuation-in-part of U.S. application Ser. No. 16/382,595, filed on Apr. 12, 2019 which claims the benefit of U.S. Provisional Patent Application No. 62/688,247, filed Jun. 21, 2018 and incorporates the disclosure of each application by reference.

BACKGROUND OF THE TECHNOLOGY

Many portable computing device owners such as those who own smart phones use a cover or protective case for the device. The cover typically conforms to the shape of the device to protect it from accidental damage caused by dropping the device or from incidental scratches to the glass or device housing. These devices are typically held by encircling a person's entire hand around the rear of the device and its case. Although this gripping method is sufficient in most cases, it does not provide a more stable form of securing the device to the person's hand to prevent it from being accidentally dropped.

Some covers include features such as a kickstand that allow the case to be rested along a side edge to facilitate hands free viewing of the device. Other covers include integrated handles or knobs that make it easier to hold the device during use. A common drawback of covers incorporating these additional elements is that the size of the cover is often many times thicker than the portable computing device itself. The resulting bulkiness of the portable computing device and cover combination may be undesirable to many users.

SUMMARY OF THE TECHNOLOGY

An apparatus for a gripping device for a portable computing device according to various aspects of the present technology may include a selectively deployable gripping element. A center section of the gripping element may be connected to the portable computing device by a gripping element retainer. The gripping element comprises opposing ends that extend away from the center section in a first position and curl inwards towards the center section and the gripping element retainer in a second position to form a ring. The opposing ends may comprise a locking mechanism configured to retain the opposing ends in the second position. The gripping element retainer may be configured to rotate with respect to the portable computing device to allow the ring to be adjusted according to a desired use. The gripping element and the gripping element retainer may also be integrated with a cover or case configured to fit around the portable computing device.

BRIEF DESCRIPTION OF THE DRAWINGS

A more complete understanding of the present technology may be derived by referring to the detailed description and claims when considered in connection with the following illustrative figures. In the following figures, like reference numbers refer to similar elements and steps throughout the figures.

FIG. 1 representatively illustrates a perspective view of a gripping element and a gripping element retainer in accordance with an exemplary embodiment of the present technology;

FIG. 2 representatively illustrates a perspective view of the gripping element, the gripping element retainer, and a base in accordance with an exemplary embodiment of the present technology;

FIG. 3 representatively illustrates a perspective view of the gripping element, the gripping element retainer, and the base with receiving arms in accordance with an exemplary embodiment of the present technology;

FIG. 4 representatively illustrates a perspective view of an assembled gripping device in accordance with an exemplary embodiment of the present technology;

FIG. 5 representatively illustrates a front view of the assembled gripping device in accordance with an exemplary embodiment of the present technology;

FIG. 6 representatively illustrates an exploded view of the gripping device in accordance with an exemplary embodiment of the present technology;

FIG. 8A representatively illustrates a perspective view of the gripping device with an integrated cover and the gripping element in the first position in accordance with an exemplary embodiment of the present technology;

FIG. 8B representatively illustrates a perspective view of the gripping device with an integrated cover and the gripping element in the second position in accordance with an exemplary embodiment of the present technology;

FIG. 9 representatively illustrates an exploded view of the gripping device and integrated cover in accordance with an exemplary embodiment of the present technology;

FIG. 23 representatively illustrates a front view of an alternative embodiment of the gripping element in accordance with an exemplary embodiment of the present technology;

FIG. 24 representatively illustrates a rear view of the gripping element shown in FIG. 23 in accordance with an exemplary embodiment of the present technology;

FIG. 25 representatively illustrates a top perspective of the gripping element shown in FIG. 23 in accordance with an exemplary embodiment of the present technology;

FIG. 26 representatively illustrates a rear perspective view of the gripping element shown in FIG. 23 in accordance with an exemplary embodiment of the present technology;

FIG. 27 representatively illustrates a detailed view of Section A shown in FIG. 25 in accordance with an exemplary embodiment of the present technology;

FIG. 28 representatively illustrates a detailed view of Section B shown in FIG. 26 in accordance with an exemplary embodiment of the present technology;

Elements and steps in the figures are illustrated for simplicity and clarity and have not necessarily been rendered according to any particular sequence. For example, steps that may be performed concurrently or in a different order are illustrated in the figures to help to improve understanding of embodiments of the present technology.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various materials, connectors, and geometries, which may carry out a variety of operations. In addition, the technology described is merely one exemplary application for the disclosed device. Further, the present technology may employ any number of conventional techniques or methods of connection.

Methods and apparatus for a gripping device for a portable computing device according to various aspects of the present technology may operate in conjunction with any material such as: plastic, metal, rubber, or other polymers. Various representative implementations of the present technology may be applied to any type of portable computing device or mobile communication device.

Referring to FIGS. 1-3, a gripping device 100 may comprise a gripping element 102 and a gripping element retainer 104. The gripping element retainer 104 may be covered by a base 202 configured to allow the gripping element retainer 104 to rotate within the base 202 and alter the orientation of the gripping element 102 during use.

Figure 7A:
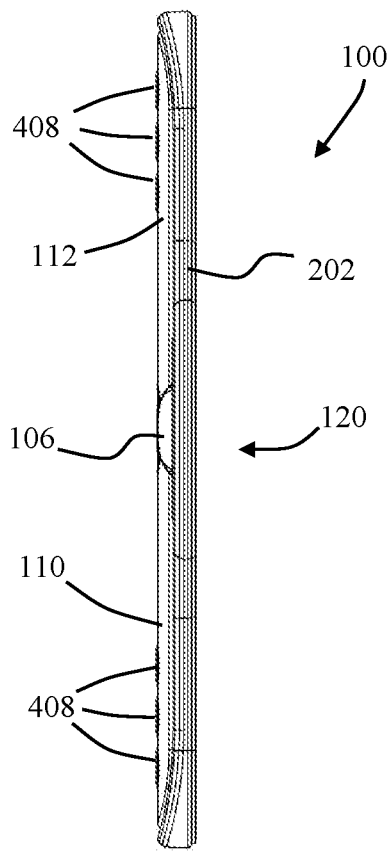
FIG. 7A representatively illustrates a side view of the gripping device with the gripping element in a first position in accordance with an exemplary embodiment of the present technology.
Figure 7B:
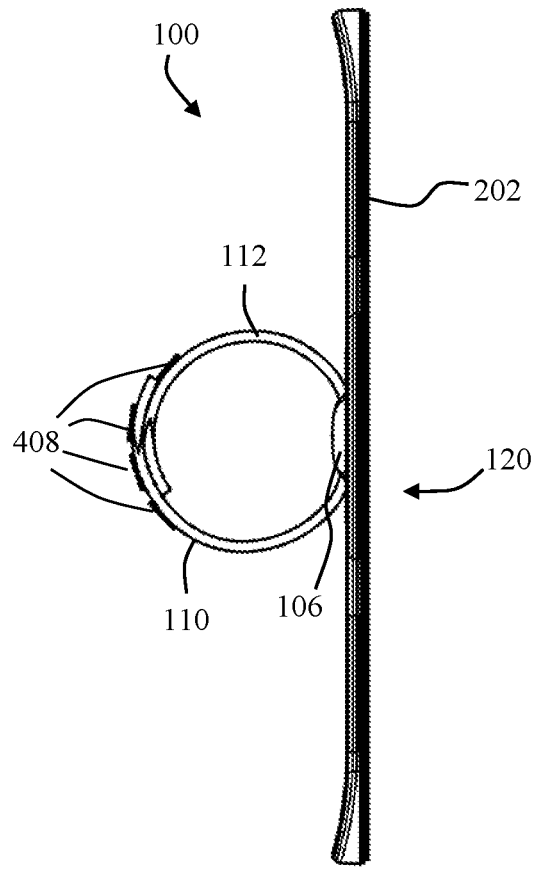
FIG. 7B representatively illustrates a side view of the gripping device with the gripping element in a second position in accordance with an exemplary embodiment of the present technology.
Figure 7C:
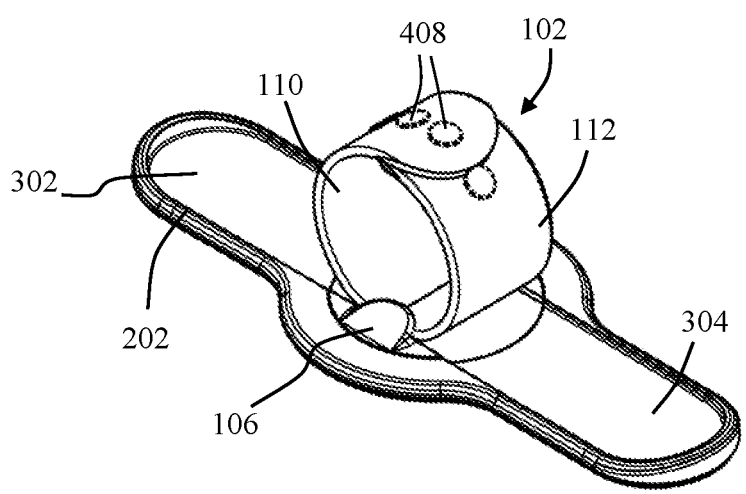
FIG. 7C representatively illustrates a perspective view of the gripping device with the gripping element in the second position in accordance with an exemplary embodiment of the present technology.
Figure 10:
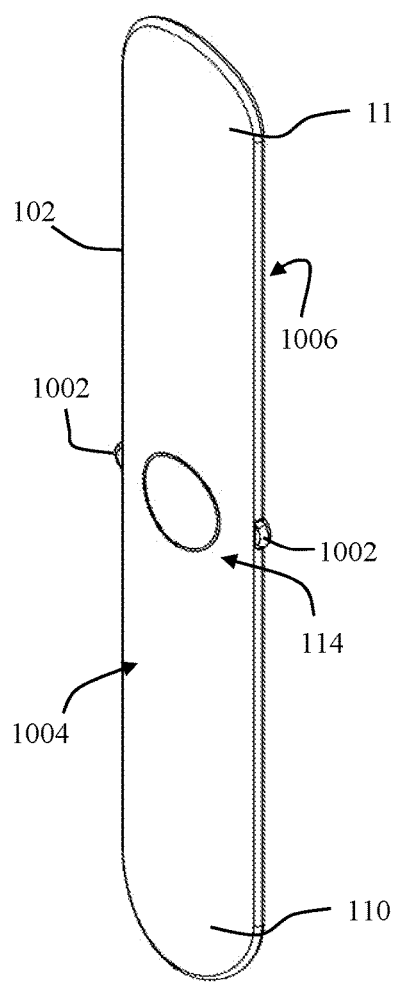
FIG. 10 representatively illustrates a front perspective view of the gripping element in accordance with an exemplary embodiment of the present technology.
Figure 11:
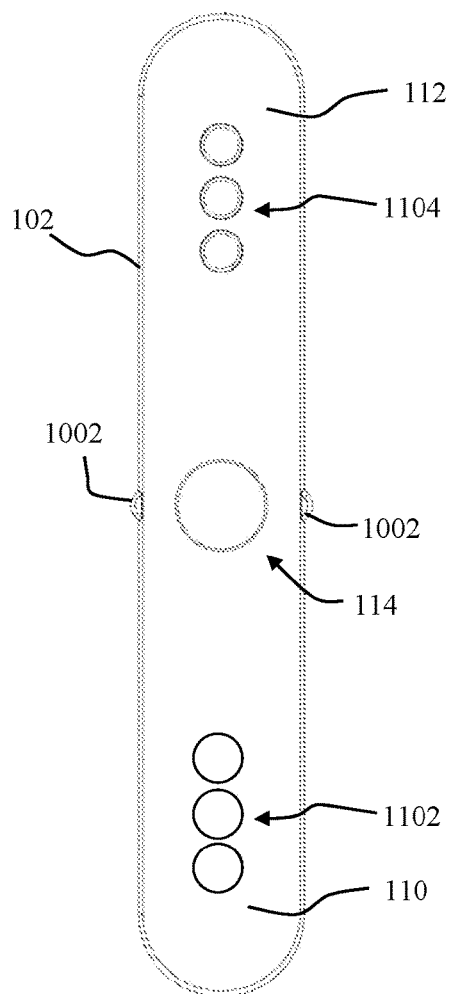
FIG. 11 representatively illustrates a front view of the gripping element in accordance with an exemplary embodiment of the present technology.
Figure 12:
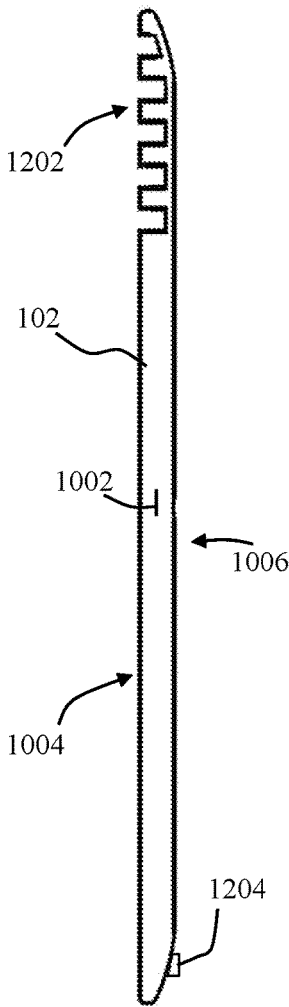
FIG. 12 representatively illustrates a side view of an alternative embodiment of the gripping element in accordance with an exemplary embodiment of the present technology.

The gripping element 102 provides a selectively deployable structure for allowing a user of a portable computing device, such as a smartphone or tablet device, to more comfortably hold and/or position the device in a desired orientation during use. The gripping element 102 may also be configured to be storable to help maintain a thin form factor of the portable computing device. For example, the gripping element 102 may comprise any suitable device that can be moved between a first, position (un-deployed/stowed) and a second position (deployed/operative). For example and referring now to FIGS. 4, 7A, and 8A, in the first position the gripping element 102 may rest flat against the base 202. In the second position and referring now to FIGS. 7B, 7C, and 8B, the gripping element 102 may form a ring-like or loop shape.

Figure 13:
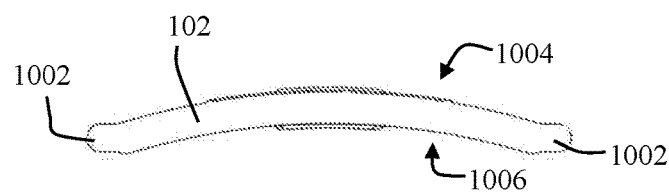
FIG. 13 representatively illustrates an end view of the gripping element in accordance with an exemplary embodiment of the present technology.
Figure 14:
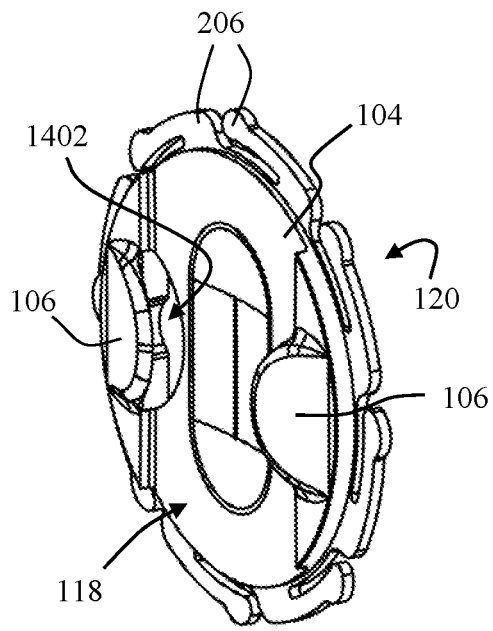
FIG. 14 representatively illustrates a front perspective view of the gripping element retainer in accordance with an exemplary embodiment of the present technology.
Figure 15:
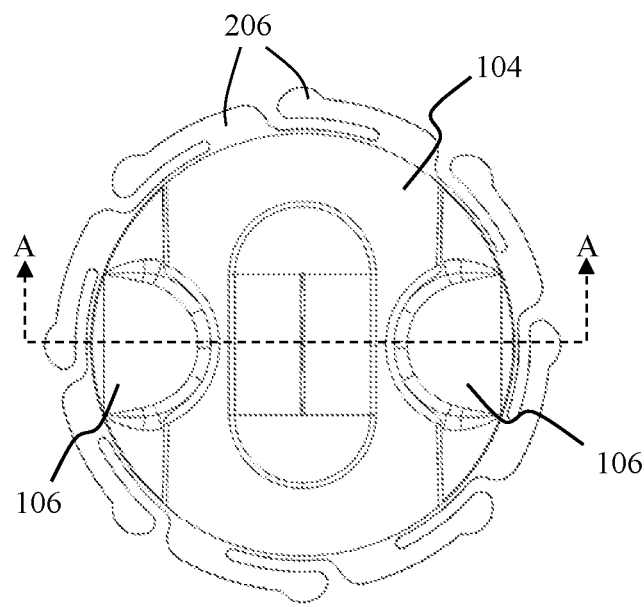
FIG. 15 representatively illustrates a front view of the gripping element retainer in accordance with an exemplary embodiment of the present technology.
Figure 16:
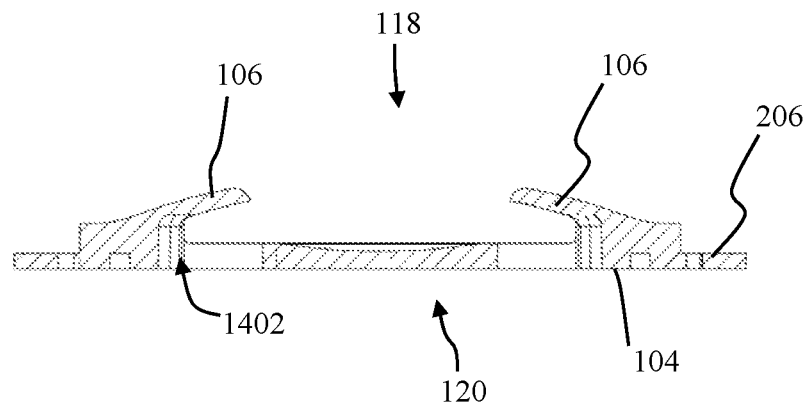
FIG. 16 representatively illustrates a cross-sectional view across line A-A of FIG. 15 in accordance with an exemplary embodiment of the present technology.
Figure 17:
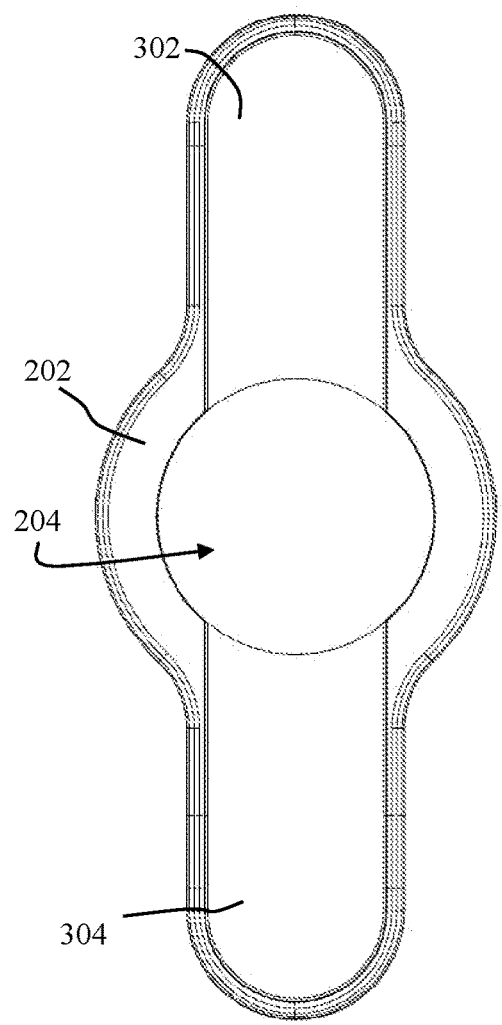
FIG. 17 representatively illustrates a front view of the base with receiving arms in accordance with an exemplary embodiment of the present technology.
Figure 18:
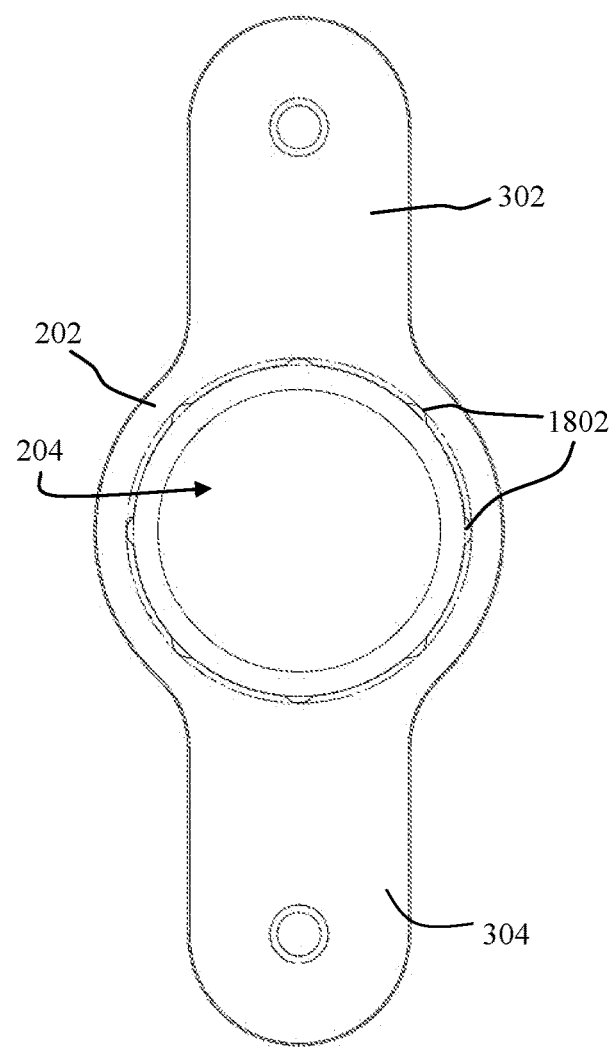
FIG. 18 representatively illustrates a rear view of the retainer housing with receiving arms in accordance with an exemplary embodiment of the present technology.
Figure 19:
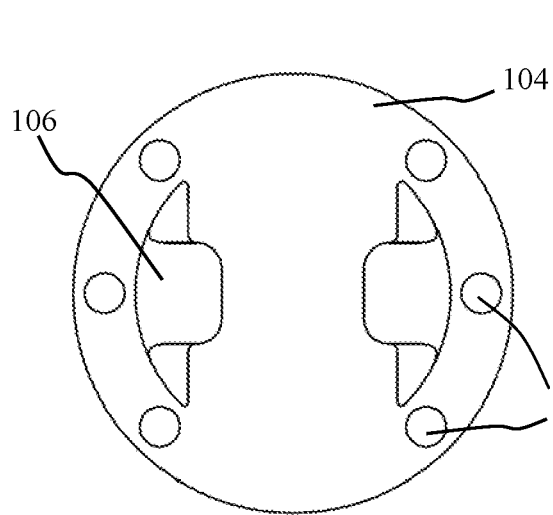
FIG. 19 representatively illustrates a front view of an alternative embodiment of the gripping element retainer in accordance with an exemplary embodiment of the present technology.
Figure 21:
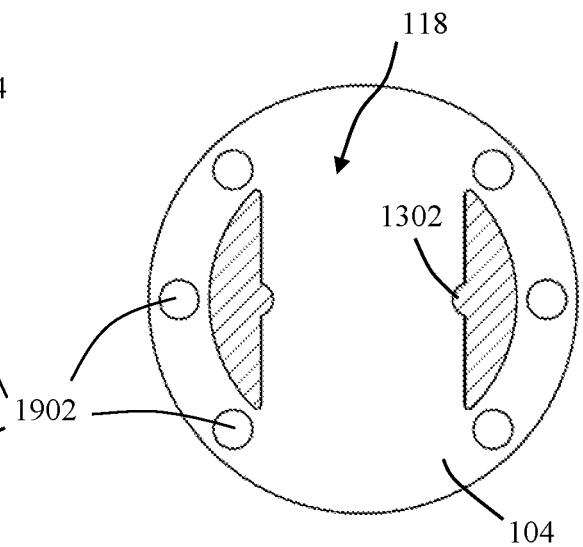
FIG. 21 representatively illustrates a cross-sectional view across line B-B of FIG. 20 in accordance with an exemplary embodiment of the present technology.
Figure 20:
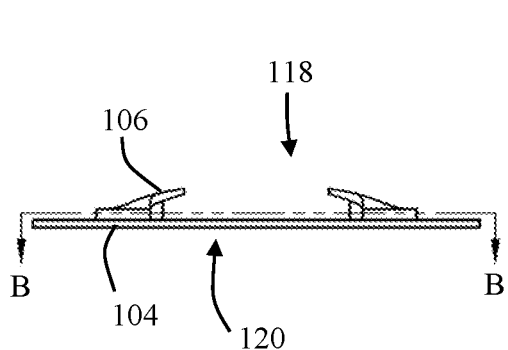
FIG. 20 representatively illustrates a side view of the alternative embodiment of the gripping element retainer of FIG. 19 in accordance with an exemplary embodiment of the present technology.
Figure 22:
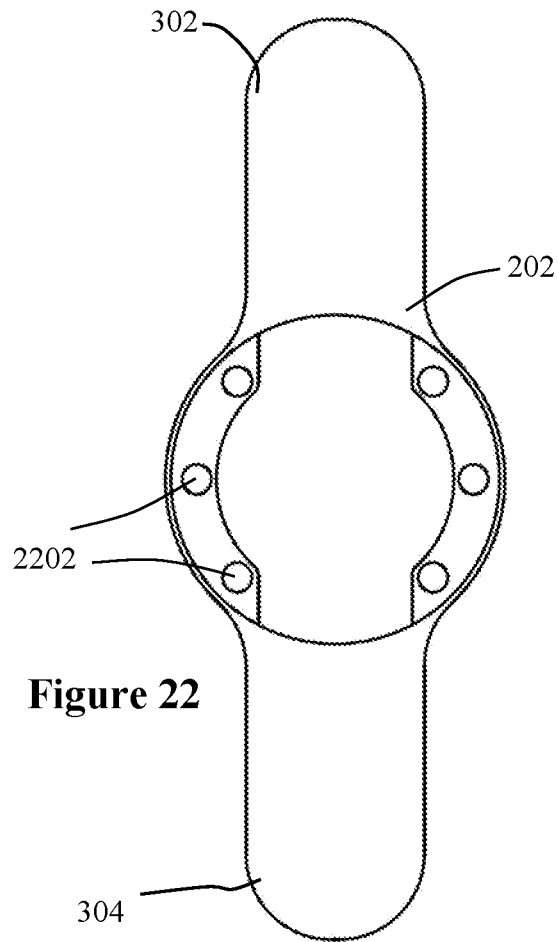
FIG. 22 representatively illustrates a rear view of an alternative embodiment of the base in accordance with an exemplary embodiment of the present technology.
Figure 29:
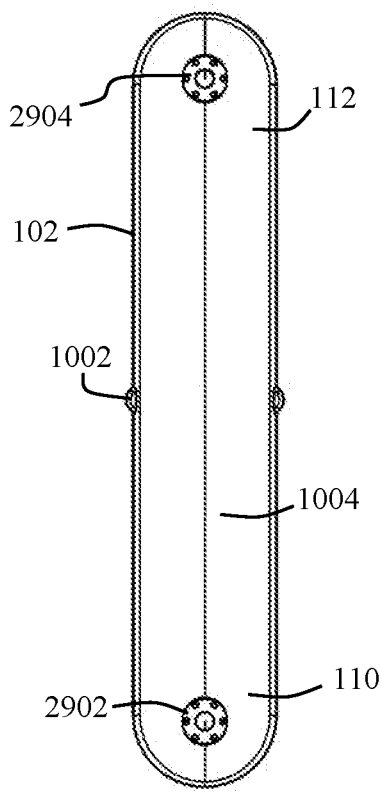
FIG. 29 representatively illustrates a front view of an alternative embodiment of the gripping element in accordance with an exemplary embodiment of the present technology.
Figure 31:
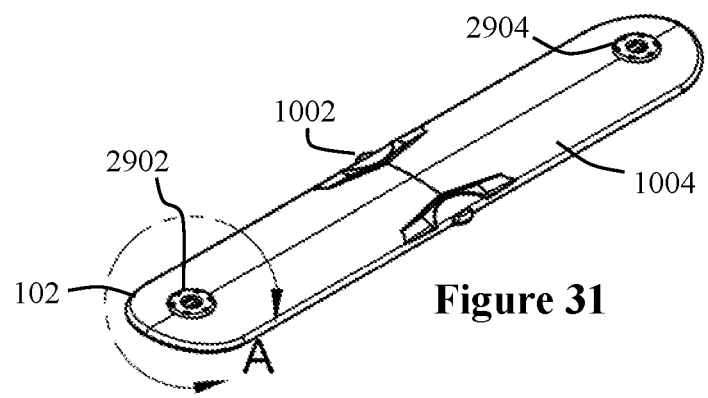
FIG. 31 representatively illustrates a top perspective of the gripping element shown in FIG. 29 in accordance with an exemplary embodiment of the present technology.
Figure 32:
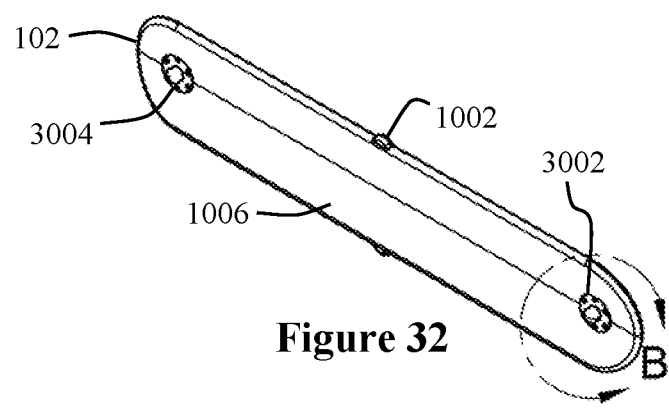
FIG. 32 representatively illustrates a rear perspective view of the gripping element shown in FIG. 29 in accordance with an exemplary embodiment of the present technology.
Figure 30:
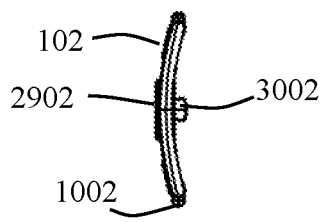
FIG. 30 representatively illustrates an end view of the gripping element shown in FIG. 29 in accordance with an exemplary embodiment of the present technology.
Figure 33:
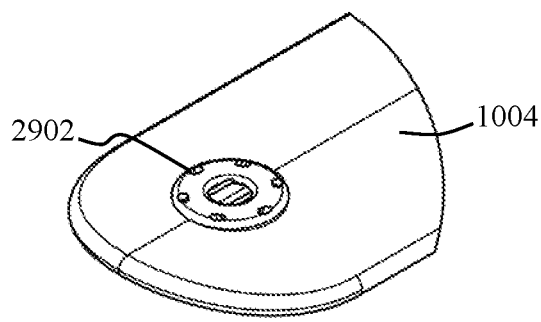
FIG. 33 representatively illustrates a detailed view of Section A shown in FIG. 31 in accordance with an exemplary embodiment of the present technology.
Figure 34:
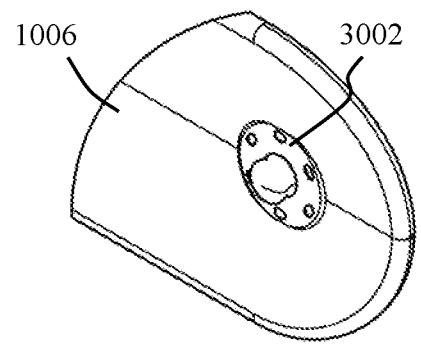
FIG. 34 representatively illustrates a detailed view of Section B shown in FIG. 32 in accordance with an exemplary embodiment of the present technology.
Figure 36:
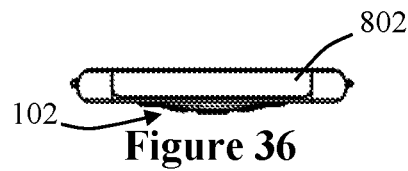
FIG. 36 representatively illustrates a top view of the integrated cover shown in FIG. 35 in accordance with an exemplary embodiment of the present technology.
Figures 35, 38, 39:
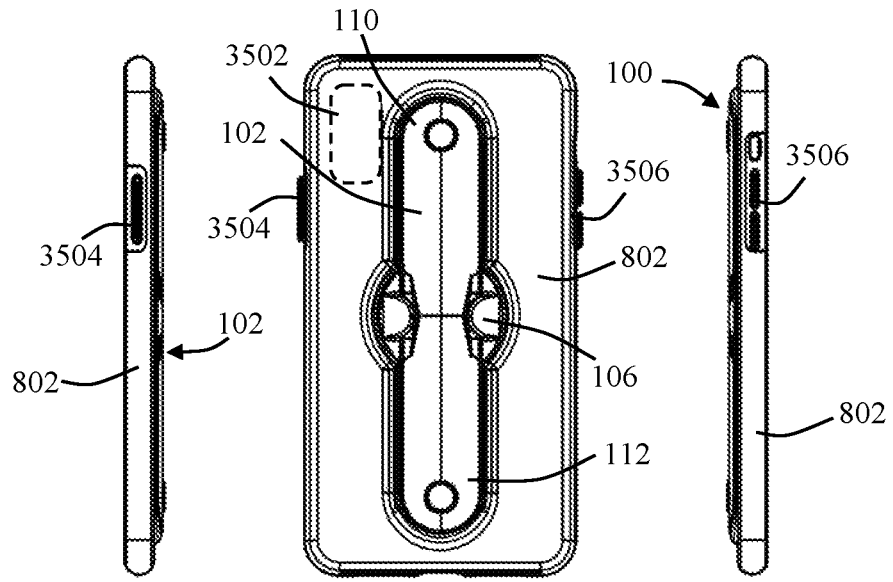
FIG. 35 representatively illustrates a front view of the gripping device with an integrated cover and the gripping element in the first position in accordance with an exemplary embodiment of the present technology.
FIG. 38 representatively illustrates a left side view of the integrated cover shown in FIG. 35 in accordance with an exemplary embodiment of the present technology.
FIG. 39 representatively illustrates a right side view of the integrated cover shown in FIG. 35 in accordance with an exemplary embodiment of the present technology.
Figure 37:
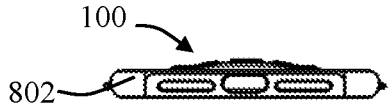
FIG. 37 representatively illustrates a bottom view of the integrated cover shown in FIG. 35 in accordance with an exemplary embodiment of the present technology.
Figures 40, 41, 42:
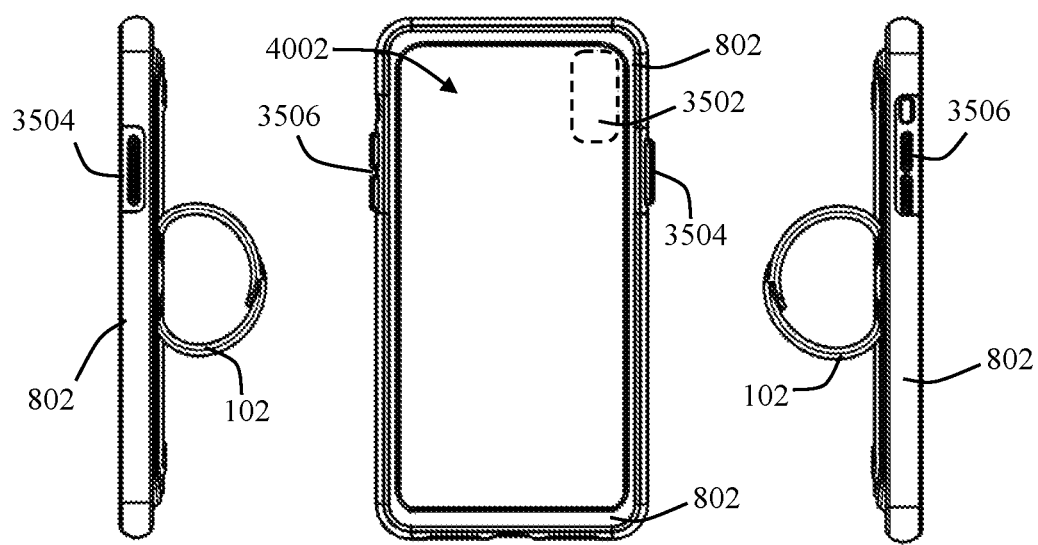
FIG. 40 representatively illustrates a rear view of the integrated cover shown in FIG. 35 in accordance with an exemplary embodiment of the present technology.
FIG. 41 representatively illustrates a left side view of the integrated cover shown in FIG. 35 with the gripping element in the second position in accordance with an exemplary embodiment of the present technology.
FIG. 42 representatively illustrates a right side view of the integrated cover shown in FIG. 35 with the gripping element in the second position in accordance with an exemplary embodiment of the present technology.
Figure 43:
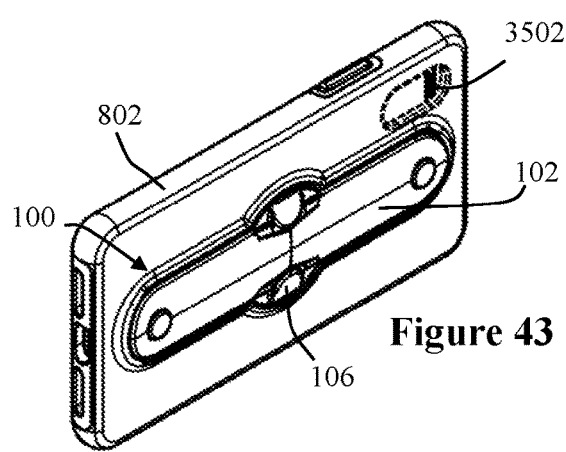
FIG. 43 representatively illustrates a left perspective view of the integrated cover shown in FIG. 35 with the gripping element in the first position in accordance with an exemplary embodiment of the present technology.
Figure 44:
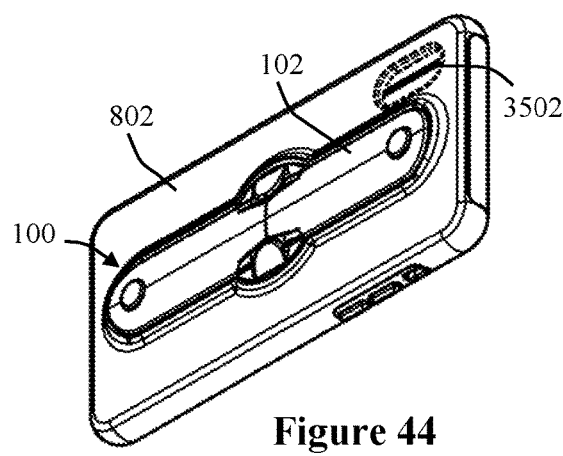
FIG. 44 representatively illustrates a right perspective view of the integrated cover shown in FIG. 35 with the gripping element in the first position in accordance with an exemplary embodiment of the present technology.
Figure 45:
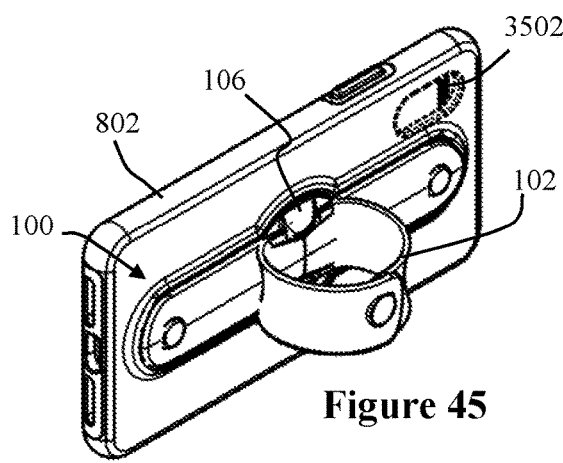
FIG. 45 representatively illustrates a left perspective view of the integrated cover shown in FIG. 35 with the gripping element in the second position in accordance with an exemplary embodiment of the present technology.
Figure 46:
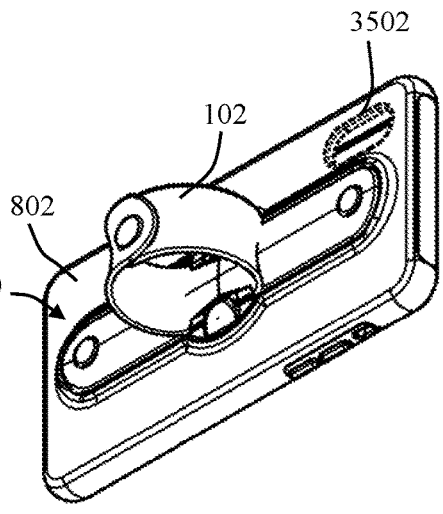
FIG. 46 representatively illustrates a right perspective view of the integrated cover shown in FIG. 35 with the gripping element in the second position in accordance with an exemplary embodiment of the present technology.
Figure 47:
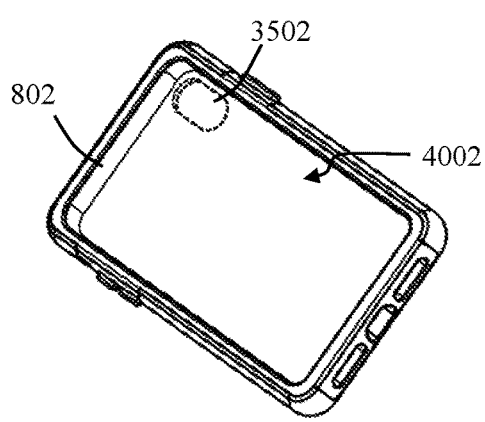
FIG. 47 representatively illustrates a rear perspective view of the integrated cover shown in FIG. 35 in accordance with an exemplary embodiment of the present technology.

The gripping element 102 may comprise any suitable device or system that can be selectively moved between the first and second positions. For example, referring now to FIGS. 1-5 and 10-12, the gripping element 102 may comprise a bi-stable spring band having a first end 110, and second end 112, a center section 114 disposed therebetween, a top surface 1004, and a bottom surface 1006 opposite the top surface 1004. In one embodiment, the band may have straight side edges that extend between rounded first and second ends 110, 112. The band may curve between the side edges along its length such that when viewed from one of the first or second ends 110, 112 the top and bottom surface 1004, 1006 form an arc as shown in FIG. 13.

The arc shape may help the gripping element 102 transition from the first position to the second position. For example, the gripping element 102 may be deployed to the second position by applying a minimum pressure to the center section 114 of the gripping element 102. When the pressure is applied, the bi-stable metal spring material retracts so that the first and second ends 110, 112 of the gripping element 102 curl towards the center section 114 and form the ring shape. Alternatively, the gripping element 102 may be configured such that one of the first and second ends 110, 112 is held in a fixed position and the other end is able to curl towards the fixed end to form the ring shape.

The bi-stable spring band may comprise any suitable material such as a metal or polymer that is suitably configured to be repeatedly moved between the first and second positions. For example, in one embodiment, the bi-stable spring band may comprise a metal such as stainless steel, brass, aluminum, sheet metal, or the like. The bi-stable spring band may comprise any suitable dimensions that may be selected according to a desired use. For example, if the portable computing device comprises a mobile smartphone, then the bi-stable spring band may comprise a length of between four and seven inches, a width of between one-half and one inch, and a thickness of less than one-tenth of an inch.

Referring now to FIGS. 6 and 9, the gripping element 102 may also comprise a cover 602 configured to enclose or otherwise house the gripping element 102. The cover 602 may comprise any suitable device for covering one or more sides, edges, and/or ends of the gripping element 102. The cover 602 may comprise any suitable material such as a polymer, elastomer, or fabric. For example, in one embodiment, the cover 602 may comprise a synthetic rubber configured to completely cover/enclose the gripping element 102.

With continued reference to FIGS. 1-5 and 10-12, the gripping element 102 may further comprise a pair of engagement tabs 1002 disposed along the side edges of the gripping element 102 and/or the cover 602. The pair of engagement tabs 1002 may be located along any suitable portion of the gripping element. For example, in one embodiment, the pair of engagement tabs 1002 may be positioned at or near the center section 114 of the gripping element 102. In an alternative embodiment, the pair of engagement tabs 1002 may be located at or near one of the first and second ends 110, 112.

The pair of engagement tabs 1002 may be used to couple the gripping element 102 to the gripping element retainer 104. The engagement tabs 1002 may comprise any suitable shape or size that is configured to engage a mating coupling mechanism on the gripping element retainer 104. For example, in one embodiment, each engagement tab 1002 may comprise a protrusion that extends outward from the side edge of the gripping element 102. In an alternative embodiment, each engagement tab 1002 may comprise a concave depression that extends into the side edge of the gripping element 102.

The first and second ends 110, 112 of the gripping element 102 may be configured to allow a diameter of the loop that is formed in the second position to be adjustable. In a first adjusted position the loop that is formed may be large enough to allow one or two fingers to fit through it while in a second adjusted position the loop may be large enough to fit around an object such as a bottle top, fence post, railing, or the like. For example, the first and second ends 110, 112 may comprise an adjustment mechanism 408 that is suitably configured to allow the first and second ends 110, 112 to be selectively positioned with respect to each other when the gripping element 102 is in the second position. The adjustment mechanism 408 may comprise any suitable device or system for allowing the first and second ends 110, 112 to be selectively coupled together to create a desired loop size.

In one embodiment, and referring now to FIGS. 6 and 9, the adjustment mechanism 408 may comprise a plurality of magnets 606 disposed along at least a portion of each of the first and second ends 110, 112. In an alternative embodiment, and referring now to FIG. 11, the adjustment mechanism 408 may comprise a set of holes 1102 disposed along at least a portion of the first end 110 and a set of protrusions 1104 configured to fit into the holes 1102 disposed along at least a portion of the second end 112. In a third embodiment, and referring now to FIG. 12, the adjustment mechanism 408 may comprise a set of recesses 1202 disposed along at least one of the top and bottom surfaces 1004, 1006 along at least a portion of each of the first and second ends 110, 112 and a ridge 1204 disposed on the opposite surface of the opposing end 110, 112 as the set of recesses 1202, wherein the ridge 1204 is configured to fit into at least one recess 1202 to couple the first and second end 110, 112 together.

In yet another embodiment, adjustment mechanism 408 may comprise a locking mechanism that is configured to prevent the first and second ends 110, 112 from coming detached from one another without an applied force. The locking mechanism may comprise any suitable system or device for allowing the first and second ends 110, 112 to be selectively coupled and decoupled from each other by a user.

In one embodiment and referring now to FIGS. 23-28, a first locking magnet 2304 may be disposed at the first end 110 of the gripping element 102 and a second locking magnet 2302 may be disposed at the second end 112 of the gripping element 102. The first and second locking magnets 2304, 2302 may each comprise a magnet having a pull strength of at least five pounds such that when the magnets are coupled together they are not easily or inadvertently separated.

The first and second locking magnets 2304, 2302 may be positioned within the top and bottom surfaces 1004, 1006 of the gripping element 102 in a manner that maintains a low profile when the gripping element 102 is in the first position. For example, referring now to FIGS. 27 and 28, the top surface 1004 may comprise a slight depression 2702 at the location of the first and second locking magnets 2304, 2302. The bottom surface 1006 may comprise a mating protrusion 2802 at the location of the first and second locking magnets 2304, 2302. The protrusion 2802 may comprise an outer dimension that is able to fit within the depression 2702 to provide a more secure mating between the first and second locking magnets 2304, 2302 when the gripping element is in the second position.

Referring now to FIGS. 29-34, in yet another embodiment, the locking mechanism may comprise a snap device disposed as the opposing first and second ends 110, 112 of the gripping element. For example, a first snap receiving body 2902 may be disposed at the first end 110 of the top surface 1004 of the gripping element 102 and a second snap receiving body 2904 may be disposed at the second end 112 of the top surface 1004 of the gripping element 102. A mating pair of snap members 3002, 3004 may be disposed at the first and second ends 110, 112, of the opposing bottom surface 1006.

When the gripping element 102 is in the second position, one of the snap members 3002, 3004 may be connected to one of the first and second snap receiving bodies 2902, 2904 to lock the first and second ends 110, 112 together. Locking the first and second ends 110, 112 together allows the gripping element 102 to remain in the second position. This feature provides the ability to securely connect the gripping device 100 to an object such as a belt loop, handle, post, or the like with a lessened likelihood that the first and second ends 110, 112 of the gripping element 102 will come unattached and allow the gripping device 100 to become disconnected.

Referring now to FIGS. 1-5 and 14-16, the gripping element retainer 104 is configured to receive the gripping element 102 and attach to the portable computing device. The gripping element retainer 104 may comprise any suitable device for positioning the gripping element 102 adjacent to the portable computing device and allowing the gripping element 102 to move between the first and second positions. The gripping element retainer 104 may be configured to attach to or otherwise be coupled to the gripping element 102 by any suitable method such as mechanically, adhesively, or by being integrated as a single unit.

For example, in one embodiment, the gripping element retainer 104 may comprise a pair of receiving tabs 106 disposed along an exterior facing surface 118 that are configured to allow the gripping element 102 to be slid lengthwise between the receiving tabs 106. The gripping element retainer 104 may be configured to couple to any portion of the gripping element 102. In one embodiment, the gripping element retainer 104 may be configured to be coupled to the center section 114 of the gripping element 102. In an alternative embodiment, the gripping element retainer 104 may be coupled to either the first or second end 110, 112 of the gripping element 102.

The gripping element retainer 104 may further comprise a tab lock 1402 disposed below each receiving tab 106 that is configured to engage the engagement tabs 1002 of the gripping element 102 to securely lock the gripping element 102 in place. The tab locks 1402 may be configured to permanently lock the gripping element 102 in place. For example, the tab locks 1402 or the engagement tabs 1002 may comprise one or more elements that are designed to create a permanent coupling between the gripping element 102 and the gripping element retainer 104. In one embodiment, each tab lock 1402 may comprise a concave recess having a one-way ridge, tab, or other protrusion along an outer edge that is configured to allow an engagement tab 1002 having a mating protrusion to be received into the recess but prevent the engagement tab 1002 from being removed from the recess.

Alternatively, the tab locks 1402 may be configured to release the gripping element 102 if a sufficient sliding force is applied to overcome the holding force between the tab locks 1402 and the engagement tabs 1002. This may allow the gripping element 102 to be interchangeable according to a user's desire such as to replace a first gripping element 102 having a first design or color with a second gripping element 102 having a different design or color. For example, each tab lock 1402 may comprise a concave recess configured to allow an engagement tab 1002 having a mating protrusion to be received into the recess and allow the engagement tab 1002 to be removed from the recess if an end of the gripping element 102 is pulled hard enough to overcome the coupling force between the recesses and the protrusions.

The base 202 covers at least a portion of the gripping element retainer 104 and may be configured to allow the gripping element retainer 104 to rotate with respect to the portable computing device. For example, referring now to FIG. 2, in one embodiment the base 202 may comprise a substantially circular rink-like body configured to cover an outer periphery of the gripping element retainer 104. The receiving tabs 106 of the gripping element retainer 104 may be positioned within an open central portion 204 of the base 202 to allow the receiving tabs 106 to receive the gripping element 102.

Referring now to FIGS. 13-15 and 17, in one embodiment the outer periphery of the gripping element retainer 104 may comprise a plurality of contacts 206 that are configured to engage one or more detents 1802 disposed on an underside of the base 202. When the base 202 is positioned over the gripping element retainer 104 the contacts 206 and the detents 1802 may engage each other to allow the gripping element retainer 104 to be rotated in a stepwise manner when the gripping element 102 is in the second position. This rotational movement allows a user to position the gripping element 102 in any desired orientation during use to facilitate holding of the portable computing device or to stand the portable computing device along an edge for hands free use.

Referring now to FIGS. 19-22, in an alternative embodiment, an outer edge portion of the gripping element retainer 104 may comprise a plurality of magnets 1902 that are configured to engage one or more secondary magnets 2202 disposed on an underside of the base 202. When the base 202 is positioned over the gripping element retainer 104 the two sets of magnets 1902, 2202 may engage each other to allow the gripping element retainer 104 to be rotated in a stepwise manner when the gripping element 102 is in the second position. Rotational movement is controlled by the magnetic fields of the two sets of magnets 1902, 2202. For example, the two sets of magnets 1902, 2202 may enable the gripping element retainer 104 to be rotated in eight different positions in forty-five degree increments.

Referring now to FIGS. 3-5, 7C, 8B, and 17, in an alternative embodiment, the base 202 may further comprise a pair of receiving arms 302, 304 that extend outwardly away from the open central portion of the base 202 in opposite directions. An outward facing surface of the receiving arms 302, 304 may be configured to engage the first and second ends 110, 112 of the gripping element 102 when the first and second ends 110, 112 are in the first position. For example, the receiving arms 302, 304 may comprise sections having a receiving area roughly the same size and shape as the first and second ends 110, 112 of the gripping element 102. The receiving arms 302, 304 may also comprise an outer edge portion that is configured to be slightly thicker than the first and second ends 110, 112 of the gripping element 102 so that the first and second ends 110, 112 are set into or flush with an upper edge of the receiving arms 302, 304 when the gripping element is oriented in the first position.

The base 202 may comprise any suitable material such as a polymer, elastomer, or fabric. For example, in one embodiment, the base 202 may comprise a synthetic rubber or plastic. The material may also be configured to be rigid, semi-rigid, or soft. For example, a lower surface of the base 202 may comprise a rigid polymer or elastomer that is configured to maintain its shape during use while the outermost edges of the base 202 and the receiving arms 302, 304 may comprise a slightly flexible or soft material.

Referring now to FIGS. 1-4, 9, 6-7B, 9, 13, and 15, a rear surface 120 of the gripping element retainer 104 may be configured to be attached or otherwise connected to the portable computing device. For example, in one embodiment the rear surface 120 may comprise an adhesive layer that can be applied directly to a surface of the gripping element retainer 104 to affix the gripping device 100 in place.

In an alternative embodiment, and referring now to FIG. 6, the rear surface 120 of the gripping element retainer 104 may comprise one or more elements used to both secure the gripping element retainer 104 to the base 202 and the portable computing device. For example, a first coupling element 612 may be used to connect a rear panel 608 to the base 202. The gripping element retainer 104 may be positioned between the rear panel 608 and the base 202. A second coupling element 610 may be positioned on an opposite surface of the rear panel 608 as the first coupling element 612. The second coupling element 610 may be configured to allow the entire gripping device 100 to be affixed or otherwise secured to the portable computing device.

The first and second coupling elements 610, 612 may comprise any suitable system or device for connecting components together. In one embodiment, the first and second coupling elements 610, 612 may each comprise a double-sided sheet of adhesive. A surface of the second coupling element 610 may comprise a removable layer that covers the adhesive surface until a user wants to affix the gripping device 100 to the portable computing device. In yet another embodiment, the rear panel 608 may be coupled to the base 202 by mechanical fastening systems such as screws, welds, soldering, or any other method of connection.

Referring now to FIGS. 8A, 8B, 9, in still another embodiment, the gripping element retainer 104 and the base 202 may be integrated into a case 802 that is sized to fit around one or more portable computing devices. The case 802 may comprise any suitable material such as a polymer, elastomer, or fabric. For example, in one embodiment, the case 802 may comprise a synthetic rubber configured to cover/enclose one or more surfaces or sides of the portable computing device. The case 802 may comprise a body configured to be either permanently attached, removably attached to, or fit around the portable computing device.

In one embodiment, the case 802 may comprise an opening 902 that largely conforms to a shape and size of the gripping element retainer 104 and/or the base 202. The rear panel 608 may be sized larger than the opening and positioned along an interior facing surface of the case 802. The base 202 may be positioned along an exterior facing surface of the case 802 and a coupling element 902 may be used to couple the base 202 to the rear panel 608 sandwiching the gripping element retainer 104 in between the base 202 and the rear panel 608.

Referring now to FIGS. 35-47, the case 802 may comprise one or more additional openings 3502 for device elements such as camera lenses, speakers, lights, or any other like element. The opening 3502 may be positioned at any location on the case 802 to account for a particular orientation of the portable computing device. The opening 3502 may also comprise any suitable dimensions or shape such as round, oval, rectangular, or the like. The gripping device 100 may be oriented along any suitable direction to account for the opening 3502. For example, the gripping device 100 may be oriented in a substantially vertical orientation if the opening 3502 is positioned in a corner of the case 802. Alternatively, and referring now to FIGS. 8A and 8B, the gripping device 100 may be oriented at an angle to accommodate an opening 804 that is oriented along an upper edge of the case 802.

A rear facing side of the 802 may comprise a receiving section 4002 that comprises a depth and outer dimensions configured to receive the portable computing device. The depth of the receiving section 4002 may be determined according to a height of two pairs of opposing sidewalls of the case 802.

These and other embodiments for methods of creating a gripping device may incorporate concepts, embodiments, and configurations as described above. The particular implementations shown and described are illustrative of the technology and its best mode and are not intended to otherwise limit the scope of the present technology in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the components and/or elements recited in any apparatus embodiment may be assembled or otherwise operationally configured in a variety of permutations to produce substantially the same result as the present technology and are accordingly not limited to the specific configuration recited in the specific examples.

As used herein, the terms "comprises," "comprising," or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to exemplary embodiments. However, changes and modifications may be made to the exemplary embodiments without departing from the scope of the present technology. These and other changes or modifications are intended to be included within the scope of the present technology, as expressed in the following claims.

The invention claimed is:

1. A gripping device for a portable computing device, comprising:
    a gripping element comprising:
        a first end having a first locking mechanism component;
        a second end having a second locking mechanism component; and
        a middle section;
    a gripping element retainer comprising:
        a forward surface comprising a pair of opposing receiving tabs extending inwardly from an outer edge towards a middle portion that are configured to selectively receive the middle section of the gripping element; and
        a rear surface configured to be attached to the portable computing device; and
    a base covering the gripping element retainer, comprising:
        an open central portion exposing the pair of opposing receiving tabs of the gripping element retainer;
        a first receiving arm extending away from the central portion; and
        a second receiving arm disposed opposite the first receiving arm and extending away from the central portion;
    wherein:
        the first and second ends of the gripping element are configured to be selectively moved between a first position and a second position;
        the first end rests flat against the first receiving arm in the first position;
        the second end rests flat against the second receiving arm in the first position; and
        the first and second ends each curl inward towards the middle section of the gripping element to form a ring in the second position.

2. A gripping device according to claim 1, wherein:
    an outer periphery of the gripping element retainer comprises a plurality of detents; and
    a rear surface of the base forms a housing covering the plurality of detents, wherein the housing comprises at least one stop configured to engage the plurality of detents to allow the gripping element retainer to rotate in a stepwise manner within the housing with respect to the portable computing device.

3. A gripping device according to claim 1, wherein the pair of opposing receiving tabs are configured to allow the gripping element to be selectively coupled to and decoupled from the gripping element retainer.

4. A gripping device according to claim 3, wherein:
    the gripping element retainer further comprises a tab lock disposed under each receiving tab; and
    the gripping element further comprises:
        a first engagement tab disposed along a first side edge; and
        a second engagement tab disposed along a second side edge opposite the first engagement tab, wherein the first and second engagement tabs are configured to engage the tab locks to couple the gripping element to the gripping element retainer.

5. A gripping device according to claim 4, wherein the gripping element further comprises a cover and the first and second engagement tabs are disposed on an outer surface of the cover.

6. A gripping device according to claim 1, wherein the first and second ends of the gripping element overlap in the second position.

7. A gripping device according to claim 1, wherein:
    the first locking mechanism component comprises a first magnet; and
    the second locking mechanism component comprises a second magnet configured to engage the first magnet to secure the first and second ends of the gripping element together.

8. A gripping device according to claim 7, wherein:
    the first and second magnets are positioned in a recess of a top surface of the gripping element at the respective first and second ends; and
    the first and second magnets protrude from a lower surface of the gripping element at the respective first and second ends.

9. A gripping device according to claim 1, wherein:
    the first locking mechanism component comprises:
        a first snap receiving body positioned on a top surface of the gripping element; and
        a first snap member positioned on a bottom surface of the gripping element; and
    the second locking mechanism component comprises:
        a second snap receiving body positioned on the top surface of the gripping element; and
        a second snap member positioned on the bottom surface of the gripping element.

10. An integrated gripping device and case for a portable computing device, comprising:
    a case body comprising:
        a receiving section configured to conform to the portable computing device; and
        an exterior surface opposite the receiving section;
    a gripping element comprising;
        a first end having a first locking mechanism component;
        a second end having a second locking mechanism component; and
        a middle section therebetween; and
    a gripping element retainer disposed along the exterior surface and comprising a forward surface having a pair of opposing receiving tabs extending inwardly from an outer edge towards a middle portion that are configured to selectively receive the middle section of the gripping element, and
    wherein, the first and second ends of the gripping element are configured to be selectively moved between a first position and a second position, wherein the first and second ends each:

rest flat against the exterior surface of the case body in the first position; and curl inward towards the middle section of the gripping element to form a ring in the second position.

11. A gripping device and case for a portable computing device according to claim 10, wherein:

the first locking mechanism component comprises a first magnet; and the second locking mechanism component comprises a second magnet configured to engage the first magnet to secure the first and second ends of the gripping element together.

12. A gripping device and case for a portable computing device according to claim 11, wherein:

the first and second magnets are positioned in a recess of a top surface of the gripping element at the respective first and second ends; and the first and second magnets protrude from a lower surface of the gripping element at the respective first and second ends.

13. A gripping device and case for a portable computing device according to claim 10, wherein:

the first locking mechanism component comprises:

a first snap receiving body positioned on a top surface of the gripping element; and a first snap member positioned on a bottom surface of the gripping element; and the second locking mechanism component comprises:

a second snap receiving body positioned on the top surface of the gripping element; and a second snap member positioned on the bottom surface of the gripping element.

14. A gripping device and case for a portable computing device according to claim 10, further comprising:

a plurality of detents disposed along an outer periphery of the gripping element retainer; and a base covering the plurality of detents, wherein the base comprises:

an open central portion exposing the pair of opposing receiving tabs of the gripping element retainer; and at least one stop configured to engage the plurality of detents to allow the gripping element retainer to rotate in a stepwise manner within the base with respect to the portable computing device.

15. A gripping device and case for a portable computing device according to claim 14, wherein the base comprises:

a first receiving arm extending away from the open central portion of the gripping element retainer, wherein the first end portion of the gripping element rests flat against the first receiving arm in the first position; and a second receiving arm disposed opposite the first receiving arm and extending away from the open central portion of the gripping element retainer, wherein the second end of the gripping element rests flat against the second receiving arm in the first position.

16. A gripping device and case for a portable computing device according to claim 14, wherein the forward surface of the gripping element retainer comprises a retaining mechanism configured to secure the middle section of the gripping element to the gripping element retainer.

17. A gripping device and case for a portable computing device according to claim 16, wherein the pair of receiving tabs are configured to allow the gripping element to be selectively coupled to and decoupled from the gripping element retainer.

18. A gripping device and case for a portable computing device according to claim 17, wherein:

the gripping element retainer further comprises a tab lock disposed under each receiving tab; and the gripping element further comprises:

a first engagement tab disposed along a first side edge of the gripping element; and a second engagement tab disposed along a second side edge of the gripping element opposite the first engagement tab, wherein the first and second engagement tabs are configured to engage the tab locks to couple the gripping element to the gripping element retainer.

* * * * *